United States Patent
Zhu

(10) Patent No.: US 10,610,025 B1
(45) Date of Patent: Apr. 7, 2020

(54) FOLDABLE CHAIR CART

(71) Applicant: MAXTON ENGINEERING LTD., Wan Chai (HK)

(72) Inventor: Shou Qiang Zhu, Wan Chai (HK)

(73) Assignee: MAXTON ENGINEERING LTD., Wai Chai (HK)

( * ) Notice: Subject to any disclaimer, the term of this patent is extended or adjusted under 35 U.S.C. 154(b) by 0 days.

(21) Appl. No.: 16/203,488

(22) Filed: Nov. 28, 2018

Related U.S. Application Data

(60) Provisional application No. 62/591,681, filed on Nov. 28, 2017.

(51) Int. Cl.
*A47C 13/00* (2006.01)
*B62B 1/12* (2006.01)
*A47C 1/14* (2006.01)

(52) U.S. Cl.
CPC .............. *A47C 13/00* (2013.01); *A47C 1/143* (2013.01); *B62B 1/12* (2013.01); *B62B 2205/06* (2013.01); *B62B 2206/006* (2013.01)

(58) Field of Classification Search
None
See application file for complete search history.

(56) References Cited

U.S. PATENT DOCUMENTS

| | | |
|---|---|---|
| 2,832,606 A | 4/1958 | Patterson |
| 3,693,993 A | 9/1972 | Mazzarelli et al. |
| 3,758,128 A | 9/1973 | Stenwall |
| 4,533,151 A * | 8/1985 | Maitland ............... A47C 1/143 280/20 |
| 4,659,142 A | 4/1987 | Kuchinsky, Jr. |
| 4,695,072 A | 9/1987 | Brooks |
| 4,733,905 A | 3/1988 | Buickerood et al. |
| 5,056,804 A | 10/1991 | Wilson et al. |
| D329,995 S | 10/1992 | Turnlington, Jr. |
| 5,265,892 A | 11/1993 | Said |
| 5,356,197 A | 10/1994 | Simic |
| 5,423,592 A | 6/1995 | Spurrier et al. |
| D394,356 S | 5/1998 | Chen |
| 5,915,722 A | 6/1999 | Thrasher et al. |
| 5,988,737 A | 11/1999 | Tomaiuolo |
| 6,079,777 A | 6/2000 | Simmons et al. |
| 6,113,129 A | 9/2000 | Marques et al. |

(Continued)

FOREIGN PATENT DOCUMENTS

GB 2567652 B * 11/2019 ............. A47C 17/70
WO WO-2016059272 A1 * 4/2016 ............. A47C 1/143

*Primary Examiner* — David E Allred
(74) *Attorney, Agent, or Firm* — Liu & Liu

(57) ABSTRACT

A collapsible/foldable and portable chair that can be transformed or converted between a chair and a cart for carrying items, and can be collapsed to a compact form for stowing. The chair cart includes a foldable chair having a seat base, a seat back pivotally attached to the seat base, and a leg rest pivotally attached to the seat base. In the collapsed configuration, the seat base, the seat back and the leg rest are folded to collapse the chair into a compact form. In the chair configuration, the seat base, seat back and the leg rest are unfolded to extend the chair to provide support surfaces for the person's back, buttock and legs. In the cart configuration, the leg rest is folded upwards with respect to the seat base to define a storage space above the seat base and between the foot rest and the seat back.

16 Claims, 12 Drawing Sheets

(56) References Cited

U.S. PATENT DOCUMENTS

| | | | |
|---|---|---|---|
| 6,131,925 | A | 10/2000 | Weldon |
| 6,357,824 | B1 | 3/2002 | Whitacre |
| D532,621 | S | 11/2006 | Lin |
| D555,950 | S | 11/2007 | Hart |
| D660,032 | S | 5/2012 | Lin et al. |
| 8,297,642 | B2 | 10/2012 | Tyson, III |
| 8,453,771 | B1 | 6/2013 | Hirschfeld |
| 8,851,503 | B2 | 10/2014 | Tyson, III |
| 8,931,831 | B2 | 1/2015 | Bassenian |
| D808,104 | S | 1/2018 | Schaaper et al. |
| D820,020 | S | 6/2018 | Oliphant et al. |
| D823,014 | S | 7/2018 | Guggenbichler |
| 10,507,856 | B1 * | 12/2019 | Malson .............. A47C 4/20 |
| 2004/0183265 | A1 | 9/2004 | Vecchio |
| 2005/0110231 | A1 * | 5/2005 | Brown .............. A45C 5/14 |
| | | | 280/47.26 |
| 2010/0025968 | A1 * | 2/2010 | Fritz .............. B62B 7/062 |
| | | | 280/647 |
| 2012/0160576 | A1 | 6/2012 | Anasiewicz |
| 2014/0001736 | A1 | 1/2014 | Daly |
| 2014/0097649 | A1 * | 4/2014 | Cardona .............. B62B 1/20 |
| | | | 297/129 |
| 2019/0023299 | A1 * | 1/2019 | Simmons .............. B60B 35/025 |

\* cited by examiner

FOLDABLE CHAIR CART

This application claims the priority of U.S. Provisional Patent Application No. 62/591,681 filed on Nov. 28, 2017. This application is fully incorporated by reference as if fully set forth herein. All publications noted below are fully incorporated by reference as if fully set forth herein.

BACKGROUND OF THE INVENTION

1. Field of the Invention

The present invention is directed to a collapsible/foldable and portable chair that can be transformed into a cart for storing and transporting items.

2. Description of Related Art

Collapsible chairs, including collapsible beach chairs, are well known in the art. They provide the advantage of space efficient transport and storage by being collapsible while also offering simple conversion into an effective configuration for sitting.

Similarly, collapsible wagons and carts, including beach wagons and carts, are well known in the art. They provide the advantage of space efficient transport and storage by being collapsible while also offering simple conversion into an effective configuration for towing items for outdoor recreational use.

Heretofore for beach goers, a collapsible beach chair is nonetheless a bulky and relatively heavy item for a person to carry, along with other articles and items such as a cooler, food containers, an umbrella, etc., from one location to another over the soft sand on the beach. These items may be carried in a beach wagon or cart. The chair adds to the overall load to be handled by the person to travel over the soft sand. The person may be worn out by the time this person reached a desired spot on the beach, which could put a damper at the start of a beach day.

It is therefore desirable to design a new and improved collapsible chair that can be transformed into a cart to carry items, thus eliminating the need for separate chair and cart.

SUMMARY OF THE INVENTION

The present invention eliminates the need for separate chair and utility cart. The present invention is directed to a collapsible/foldable and portable chair that can be transformed or converted between a chair and a cart for carrying items, and can be collapsed to a compact form for stowing.

The present invention is directed to a chair cart, comprising: a foldable chair, which comprises: a seat base; a seat back pivotally attached to the seat base; and a leg rest pivotally attached to the seat base, wherein the chair is foldable from a collapsed configuration for stowing the chair, to a chair configuration for seating a person, to a cart configuration for holding articles, wherein in the collapsed configuration, the seat base, the seat back and the leg rest are folded to collapse the chair into a compact form, wherein in the chair configuration, the seat base, seat back and the leg rest are unfolded to extend the chair to provide support surfaces for the person's back, buttock and legs, and wherein in the cart configuration, the leg rest is folded upwards with respect to the seat base to define a storage space above the seat base and between the foot rest and the seat back.

In the collapsed configuration, the seat base is folded upwards towards the seat back with the support surfaces of the seat back and seat base facing each other, and the foot rest is folded downwards towards the seat base with the support surfaces of the seat base and leg rest facing away from each other. In the cart configuration, the leg rest is folded upwards with the support surfaces of the leg rest and seat back facing each other.

The seat base has a base frame, the seat back has a back frame, and the leg rest has a rest frame. The base frame is pivotally attached to the back frame, and the rest frame is pivotally attached to the base frame. The base frame, the back frame and the rest frame support a flexible web material to provide the support surfaces. The web material extends continuously from the rest frame to the base frame and to the back frame.

In the cart configuration, a flexible basket is provided in the storage space for holding the articles. In the cart configuration, the flexible basket is attached to the back frame and the rest frame, and rest on the support surface of the seat base, thereby forming a container for securely holding the articles. The chair further comprising a pair of arm rests pivotally attached to opposing edges of the seat back, whereby in the cart configuration, the arm rests provide lateral support for the flexible basket.

The chair further comprises legs pivotally attached to the seat base, and having ends pivotally attached to the respective arm rests, thereby providing support of the seat base and the arm rests in the chair configuration. The legs are interconnected to form a leg frame.

A pair of wheels are rotatably attached to the base frame near the pivot joint between the back frame and the base frame. Struts are provided, each having one end slidably coupled to the respective legs and another end pivotally attached to the base frame near the pivot joint between the base frame and the rest frame, so as to improve rigidity and/or structural integrity of the base frame with respect to the leg frame when the chair is in the chair configuration or the cart configuration.

A handle is attached to the back frame, thereby facilitating tilting the cart. The handle is further attached to the base frame. The handle is pivotally attached to the back frame and the base frame. The handle comprises a handle bar pivotally attached to the back frame, and an extendible handle strut pivotally attached to the handle bar and pivotally attached to the base frame. In the chair configuration, the handle bar is pivoted to adjacent the seat back with the handle strut retracted, and in the cart configuration, the handle bar is pivoted to extend above the back frame with the handle strut extended and secured to the handle bar, thereby facilitating tilting and pulling or pushing the cart.

In one embodiment, the inventive chair cart is substantially as described and illustrated.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE INVENTION

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

Figure 1A:
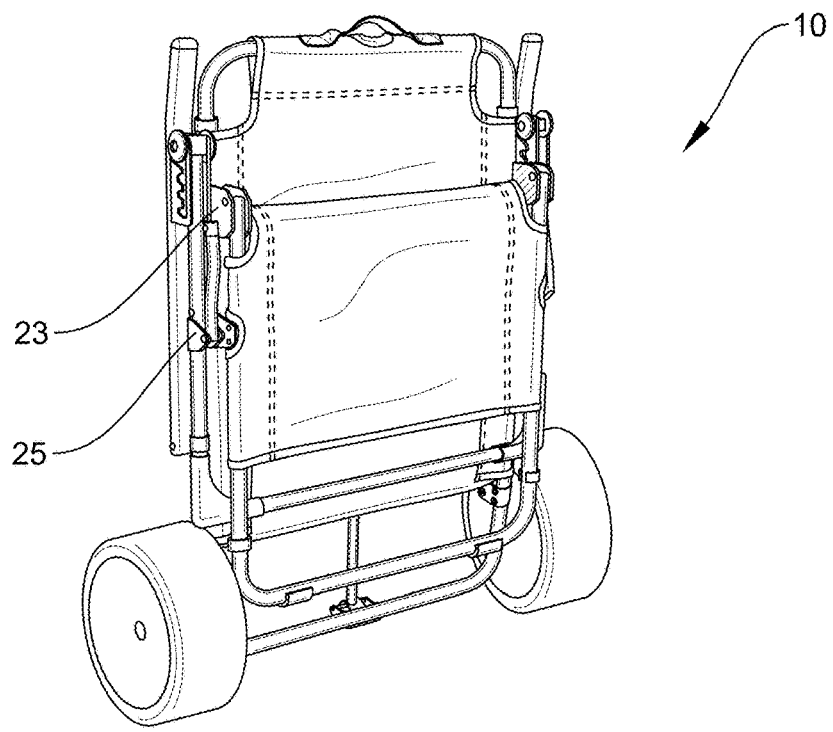
FIG. 1A illustrates a chair cart in a collapsed configuration in accordance with one embodiment of the present invention.
Figure 1B:
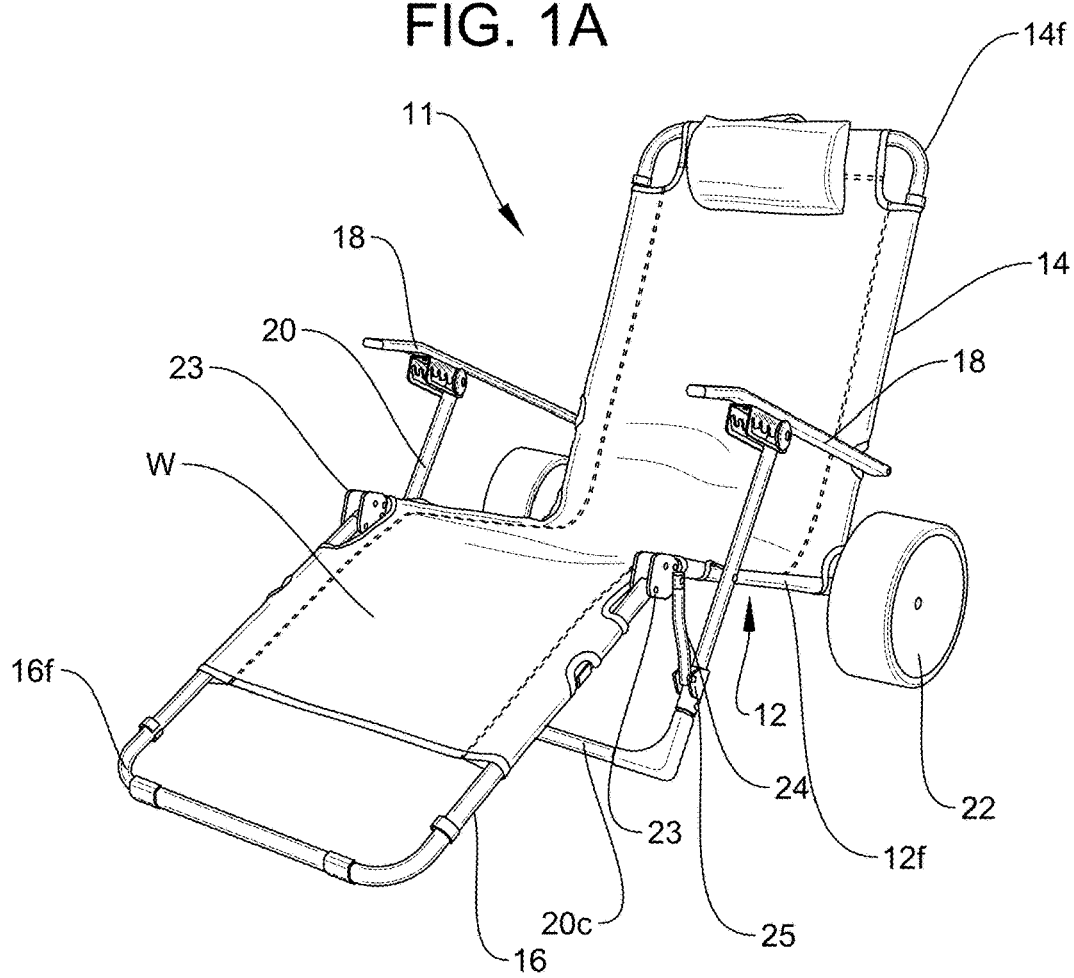
FIG. 1B illustrates the chair cart in a chair configuration in accordance with one embodiment of the present invention.
Figure 1C:
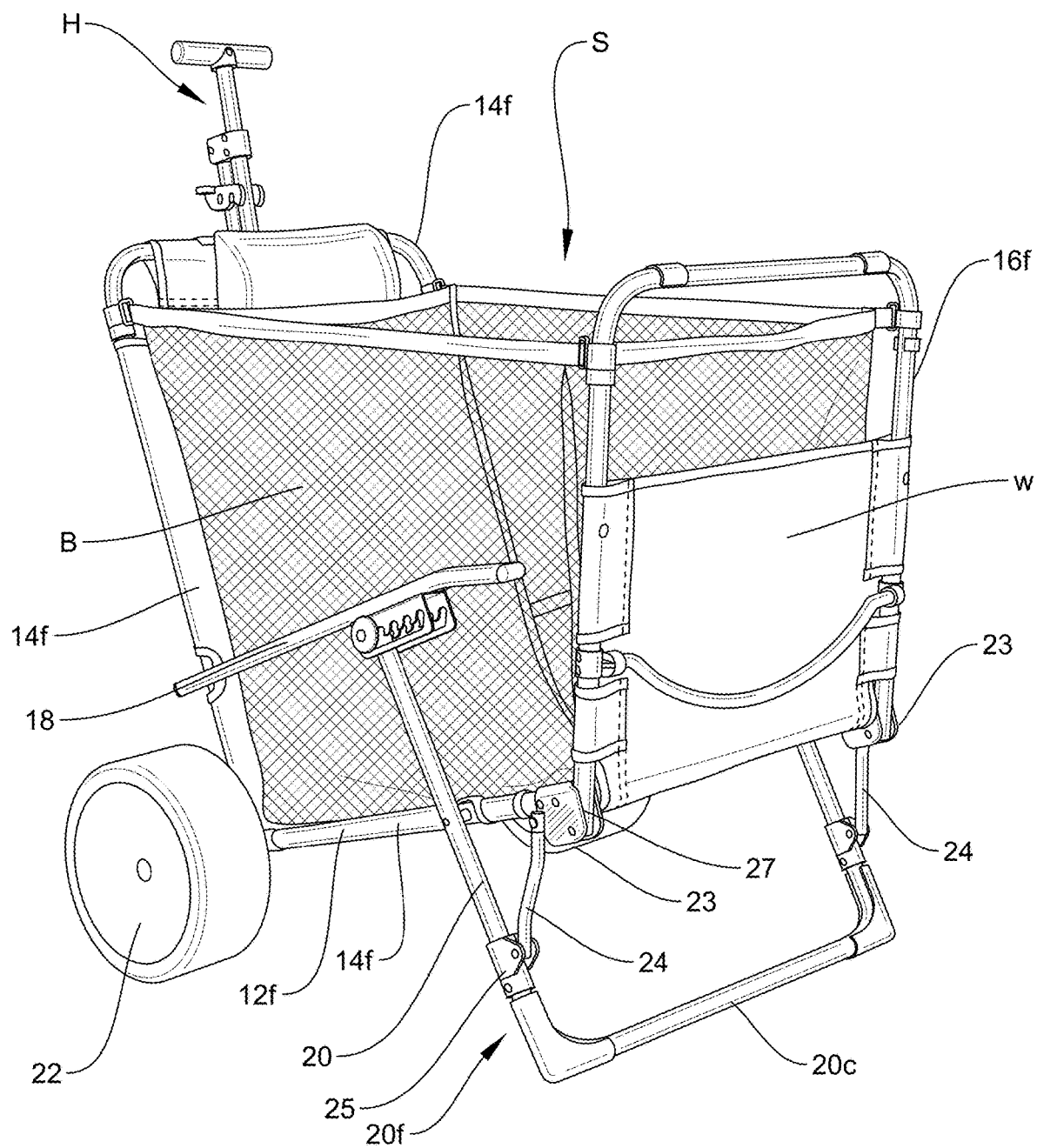
FIG. 1C illustrates the chair cart in a cart configuration in accordance with one embodiment of the present invention.

FIG. 1A illustrates a chair cart in a collapsed configuration for stowing in accordance with one embodiment of the present invention; FIG. 1B illustrates the chair cart in a chair configuration in accordance with one embodiment of the present invention; FIG. 1C illustrates the chair cart in a cart configuration in accordance with one embodiment of the present invention.

The inventive chair cart 10 comprises: a foldable chair 11, which comprises: a seat base 12; a seat back 14 pivotally attached to the seat base 12; and a leg rest 16 pivotally attached to the seat base 12 by pivot bracket 23, wherein the chair is foldable from a collapsed configuration as shown in FIG. 1A for stowing the chair, to a chair configuration as shown in FIG. 1B for seating a person, to a cart configuration as shown in FIG. 1C for holding articles. In the collapsed configuration shown in FIG. 1A, the seat base 12, the seat back 14 and the leg rest 16 are folded to collapse the chair into a compact form. In the chair configuration shown in FIG. 1B, the seat base 12, seat back 14 and the leg rest 16 are unfolded to extend the chair to provide support surfaces for the person's back, buttock and legs. In the cart configuration shown in FIG. 1C, the leg rest 16 is folded upwards with respect to the seat base 12 to define a storage space S above the seat base 12 and between the foot rest 16 and the seat back 14.

In the collapsed configuration shown in FIG. 1A, the seat base 12 is folded upwards towards the seat back 14 with the support surfaces of the seat back 14 and seat base 12 facing each other, and the foot rest 16 is folded downwards towards the seat base 12 with the support surfaces of the seat base 12 and leg rest 16 facing away from each other. In the cart configuration shown in FIG. 1C, the leg rest 16 is folded upwards with the support surfaces of the leg rest 16 and seat back 14 facing each other and the seat base 12 extending therebetween.

In the illustrated embodiment, the seat base 12 has a base frame 12f, the seat back has a back frame 14f, and the leg rest 16 has a rest frame 16f. The base frame 12f is pivotally attached to the back frame 14f (at the wheel area), and the rest frame 16f is pivotally attached to the base frame 12f by the pivot brackets 23. The base frame 12f, the back frame 14f and the rest frame 16f support a flexible web material W to provide the support surfaces. The web material W is in a stretched or taut state when in the chair configuration shown in FIG. 1B, so as to provide a sturdy but comfortable soft seating/support surfaces. In one embodiment, the web material W is stretched to extend continuously from the rest frame to the base frame and to the back frame. In another embodiment, the web material may be separate for each of the base frame 12f, back frame 14f and rest frame 16f.

In the cart configuration shown in FIG. 1C, the end of each side of the rest frame 16f is held in a groove 27 in the pivot bracket 23. A flexible basket B is received within the storage space S for holding the articles. The basket B may be made of a mesh or net material, or a closed sheet material. In the cart configuration, the flexible basket B is attached to the back frame 14f and the rest frame 16f using detachable fasteners (e.g., Velcro fasteners, straps, ties, fasteners, or hooks) that can be conveniently removed from back frame 14f by the user, and rest on the support surface of the seat base 12f, thereby forming a container occupying the space defined between the surfaces of the seat base 14, the foot rest 16 and the seat base 12, for securely holding the articles. The basket B may include a reinforced strip at the opening of the basket, so as to securely hold the rest frame 16f in the folded configuration facing the back frame 14f in the position shown in FIG. 1C, to prevent the rest frame 16f from falling towards the ground (i.e., back to the chair configuration shown in FIG. 1B). The chair 11 further comprising a pair of arm rests 18 pivotally attached to opposing sides of the back frame 14f, whereby in the cart configuration, the arm rests 18 provide lateral support for the flexible basket B.

The chair 11 further comprises legs 20 pivotally attached to the opposing sides of seat frame 12f, and having ends pivotally attached to the respective arm rests 18, thereby providing support of the base frame 12f and the arm rests 18 in the chair configuration shown in FIG. 1B. In the illustrated embodiment, the legs 20 are interconnected by a cross bar 20c, thereby to form a leg frame 20f.

To facilitate moving the cart, a pair of wheels 22 are rotatably attached to the base frame near the pivot joint between the back frame 14f and the base frame 12f. Struts 24 are provided, each having one end slidably coupled to the respective legs 20 by a slidable bracket 25 and another end pivotally attached to the base frame 12f by the pivot bracket 23 that provides the pivot joint between the base frame 12f and the rest frame 16f, so as to improve rigidity and/or structural integrity of the base frame 12f with respect to the leg frame 20f when in the chair configuration in FIG. 1B or the cart configuration in FIG. 1C.

Figure 3:
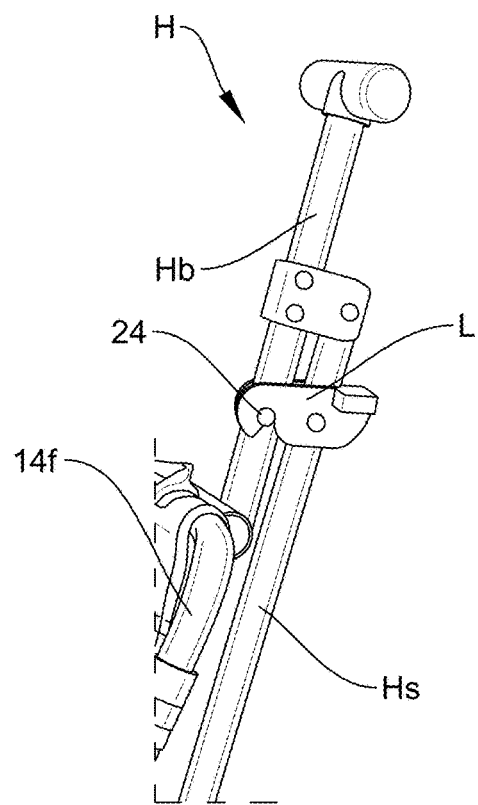
FIG. 3 is a close-up view of the handle portion.

A handle H is attached to the back frame 14f, to facilitate tilting the cart to roll the cart on its wheels 22. The handle H is further attached to the base frame 12f. In the illustrated embodiment, the handle H is pivotally attached to the back frame and the base frame. The handle H comprises a handle bar Hb pivotally attached to the top section of the back frame 12f, and an extendible handle strut Hs having an end pivotally attached to the handle bar Hb and an opposite end pivotally attached to a cross section of the base frame 12f. In the chair configuration in FIG. 1B, the handle bar Hb is pivoted to adjacent the seat back 14 with the handle strut Hs retracted. In the cart configuration in FIG. 1C, the handle bar Hb is pivoted to extend above the top of the back frame 14f with the handle strut Hs extended and secured to the handle bar Hb by a latch L having a hook latching onto a stud 24 on the side of the handle bar Hb. FIG. 3 is a close-up view of the handle strut Hs secured to the handle bar Hb by a latch L. In this latched position, the handle bar Hb is prevented from pivoting with respect to the back frame 14f, thereby forming a rigid handle structure to facilitate tilting, pulling and pushing the cart on its wheels 22.

Figure 2A:
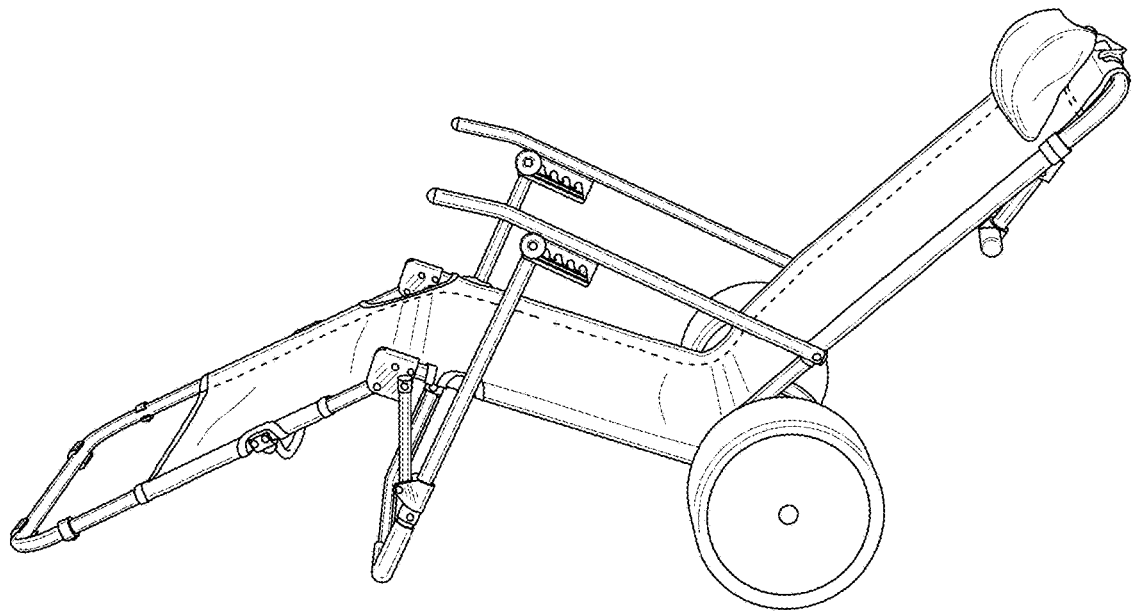
FIGS. 2A to 2S illustrate the sequence of folding from the chair configuration in FIG. 1B to the cart configuration in FIG. 1C.
Figure 2B:
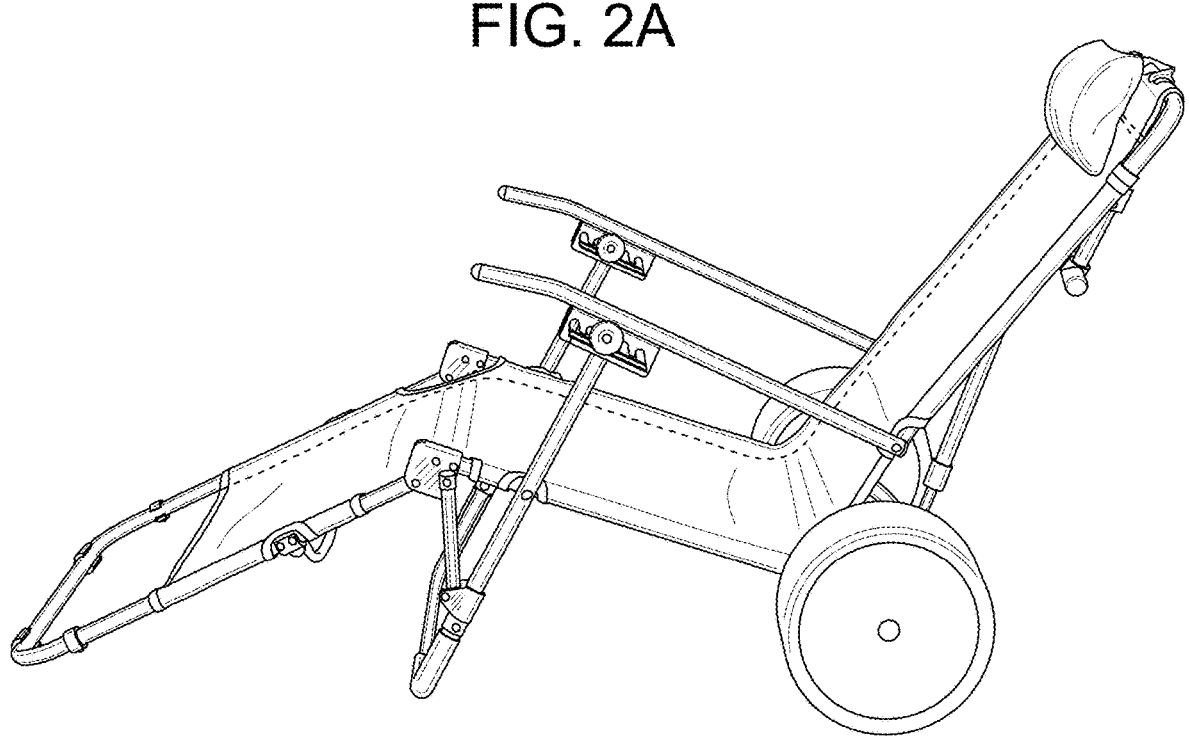
Figure 2C:
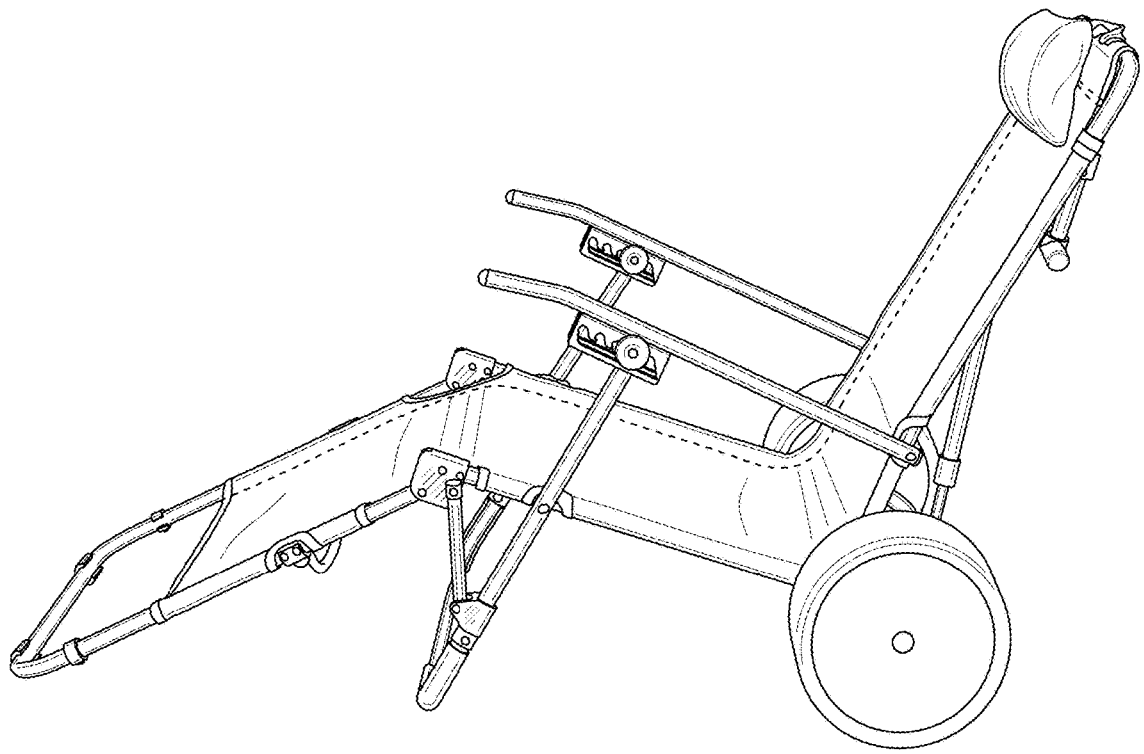
Figure 2D:
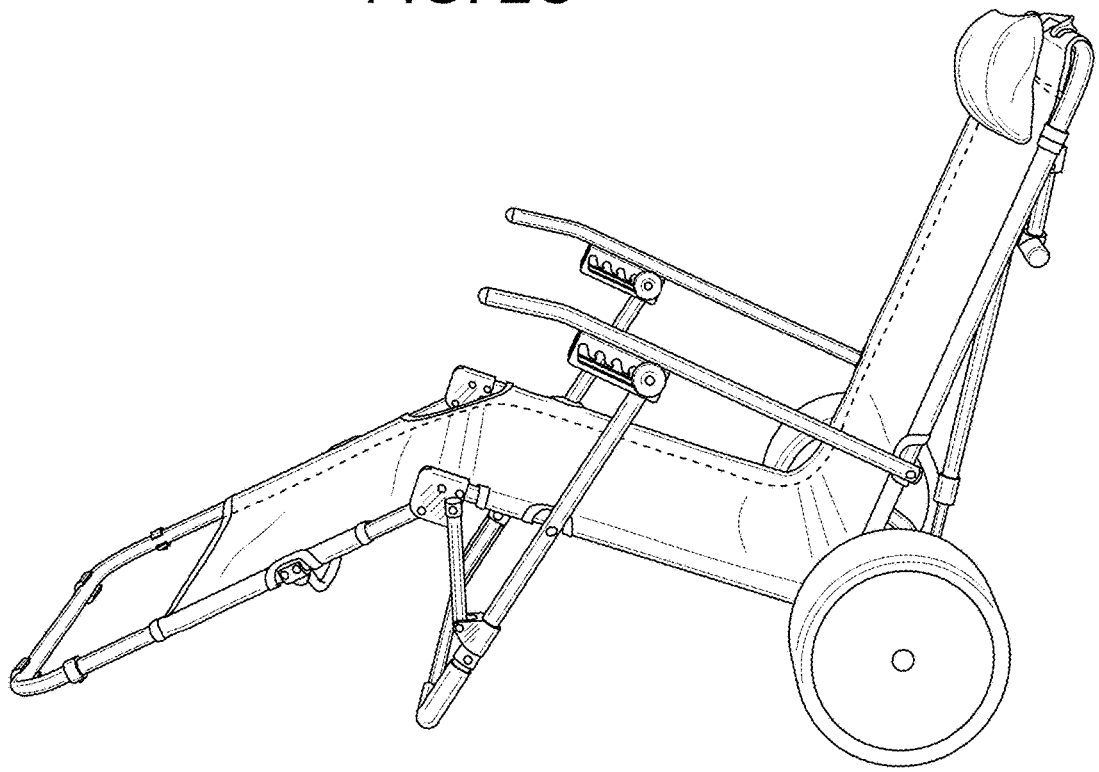
Figure 2E:
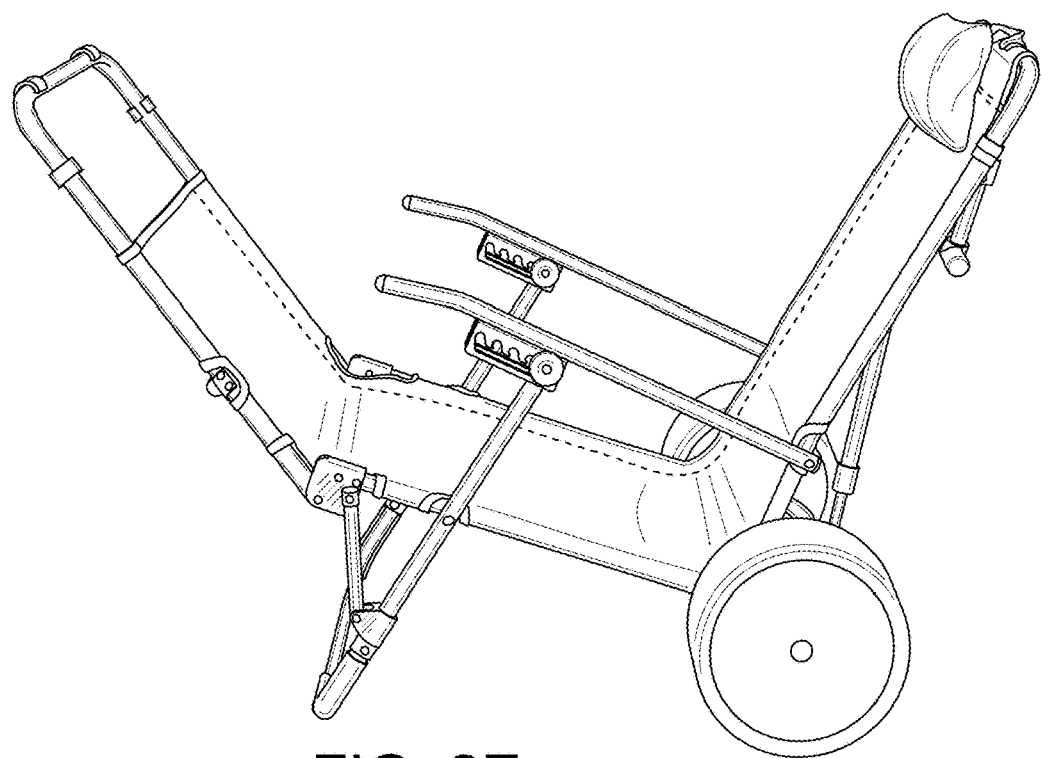
Figure 2F:
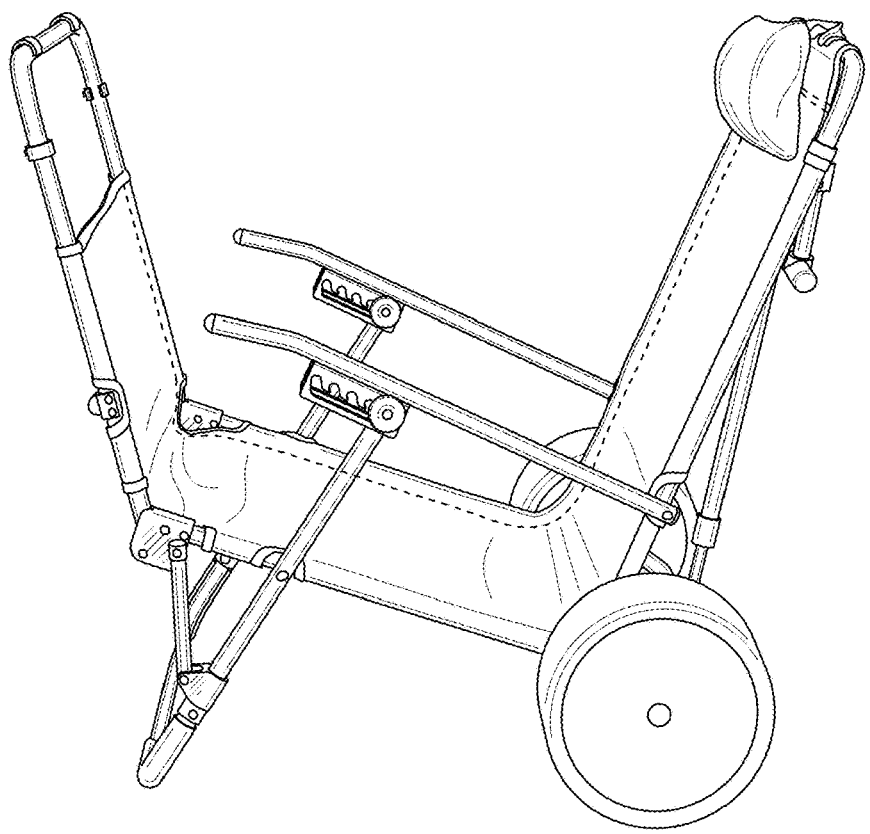
Figure 2G:
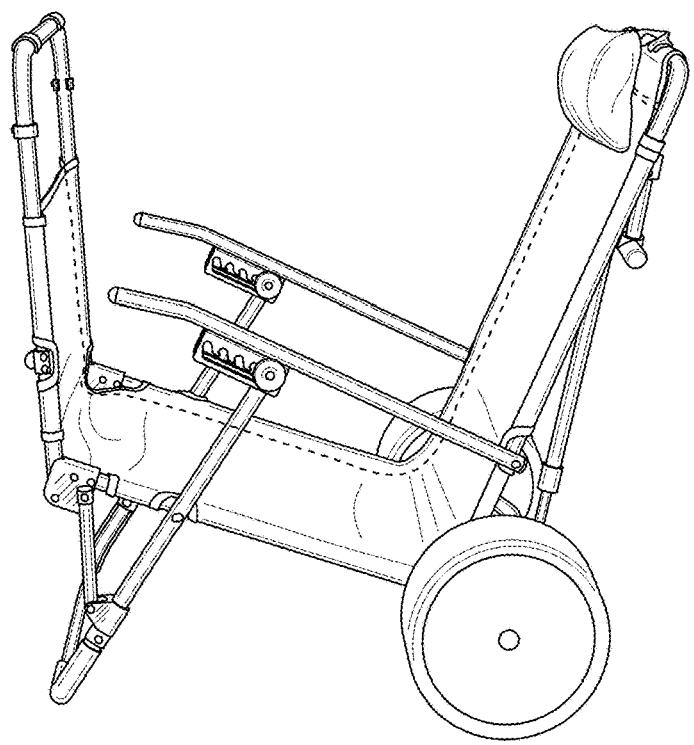
Figure 2H:
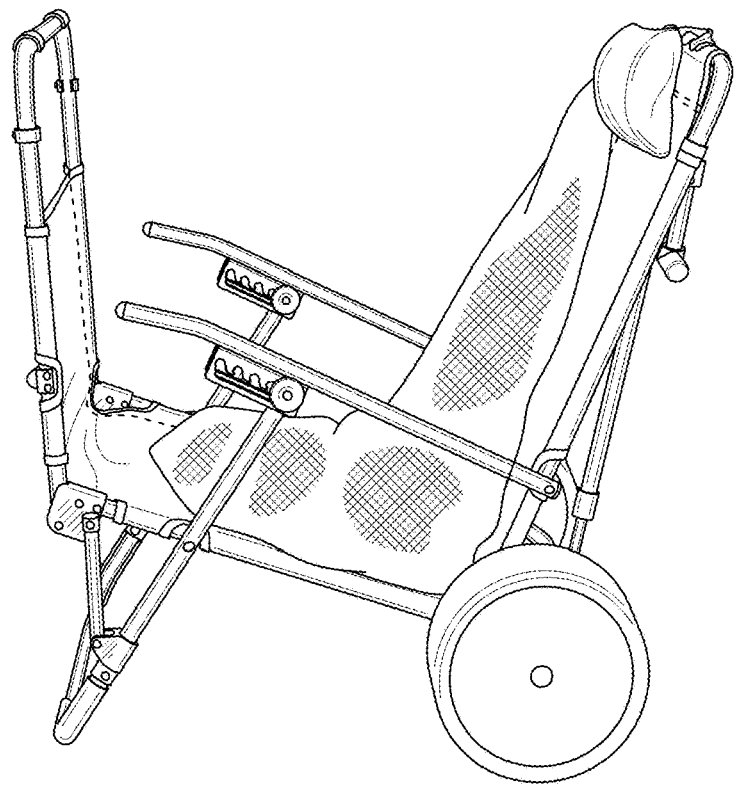
Figure 2I:
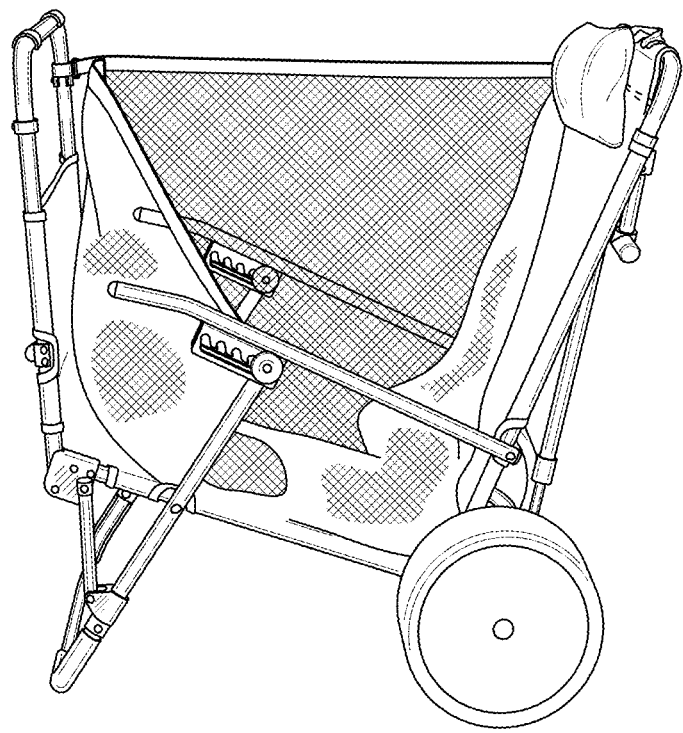
Figure 2J:
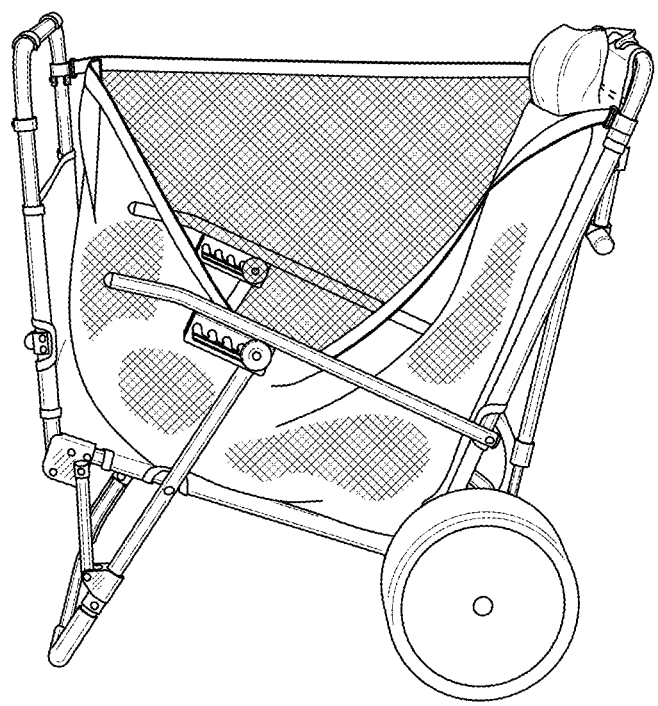
Figure 2K:
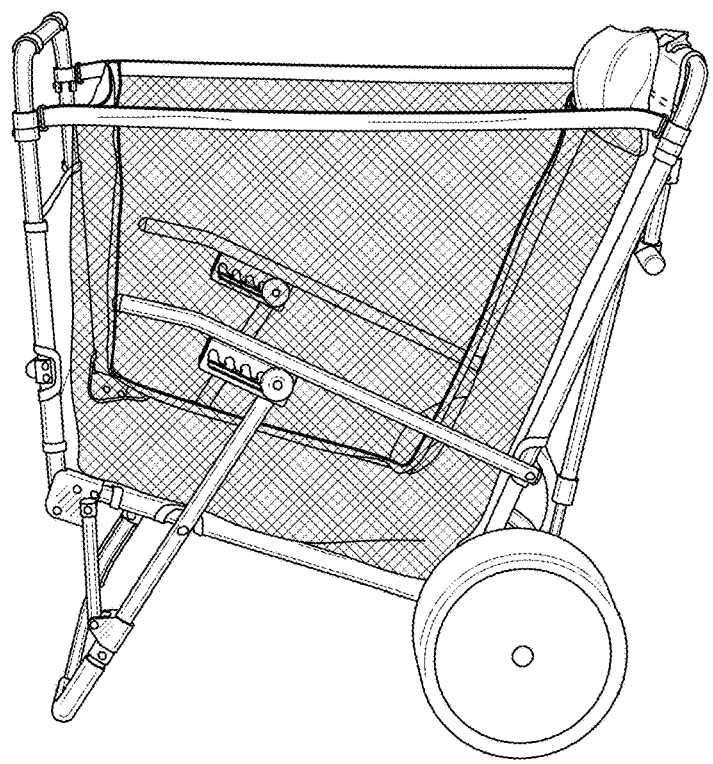
Figure 2L:
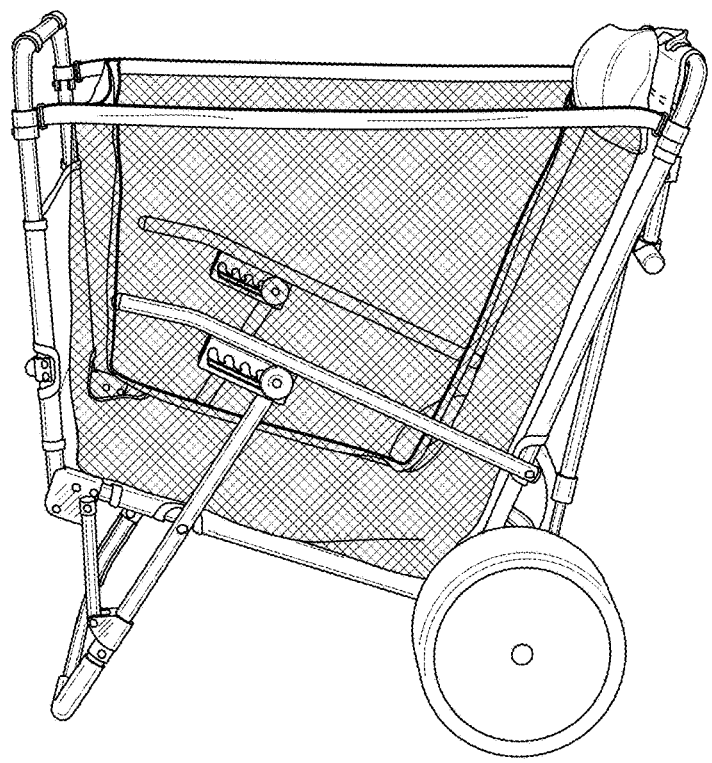
Figure 2M:
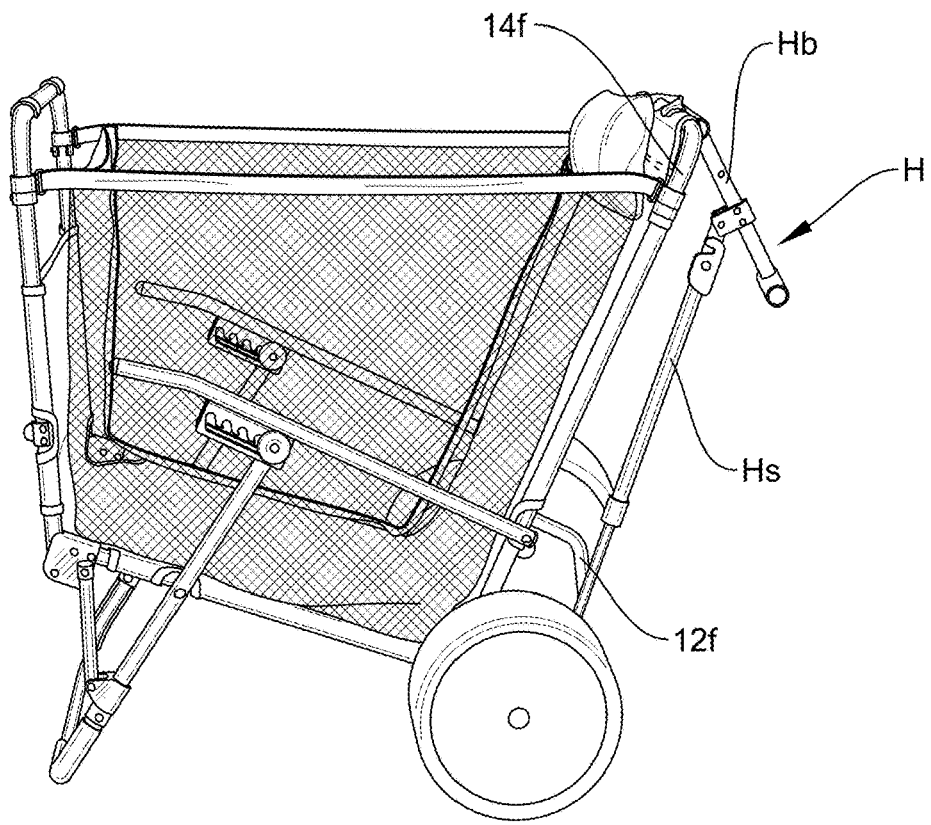
Figure 2N:
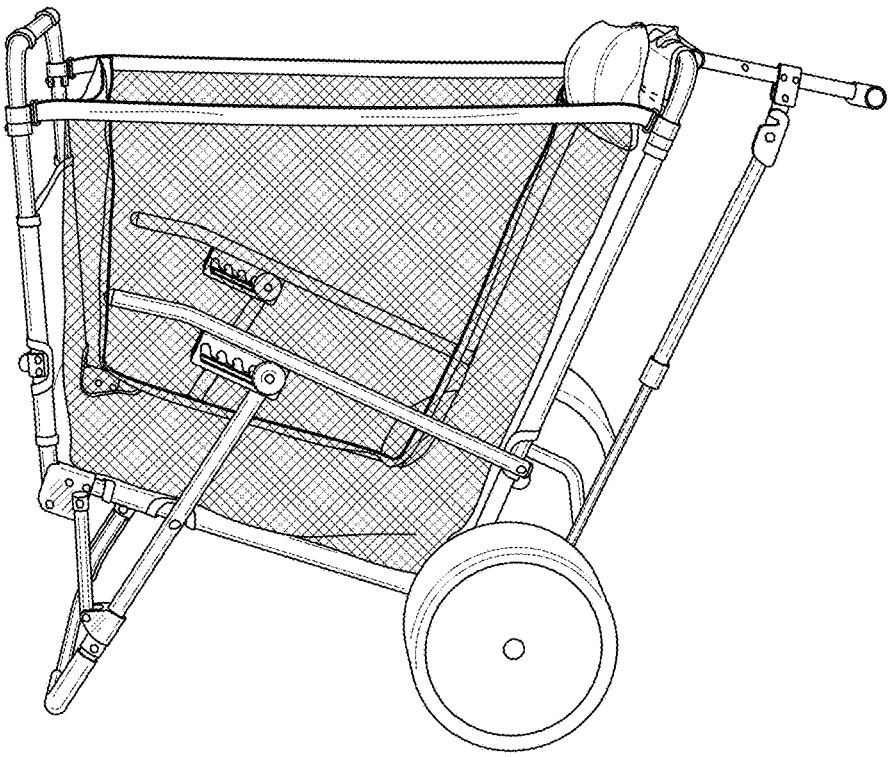
Figure 2O:
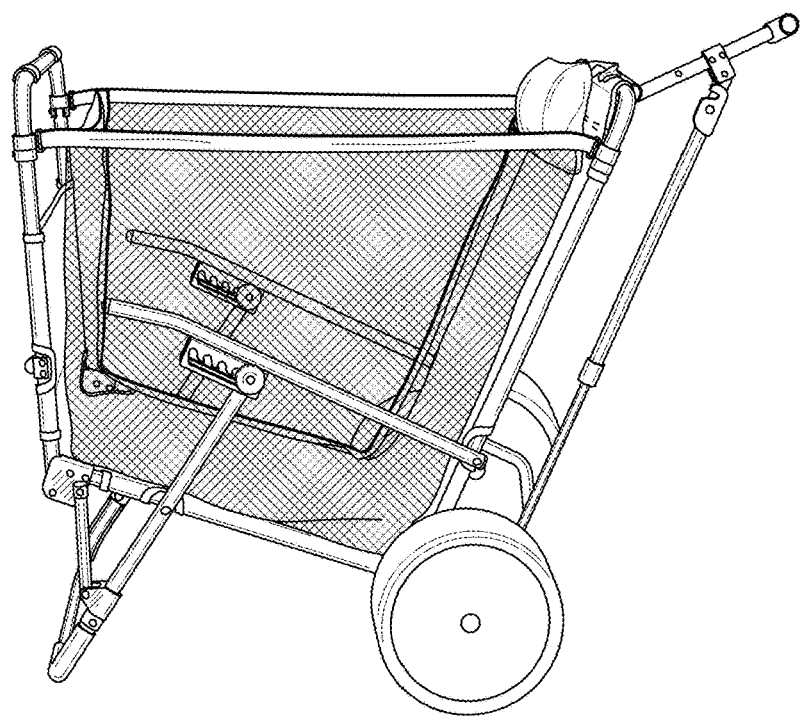
Figure 2P:
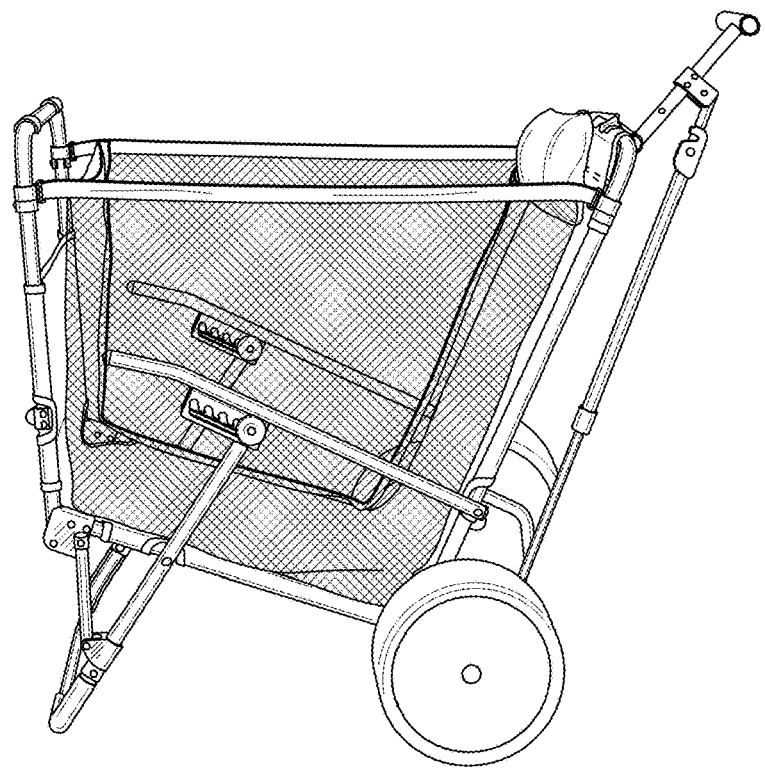
Figure 2Q:
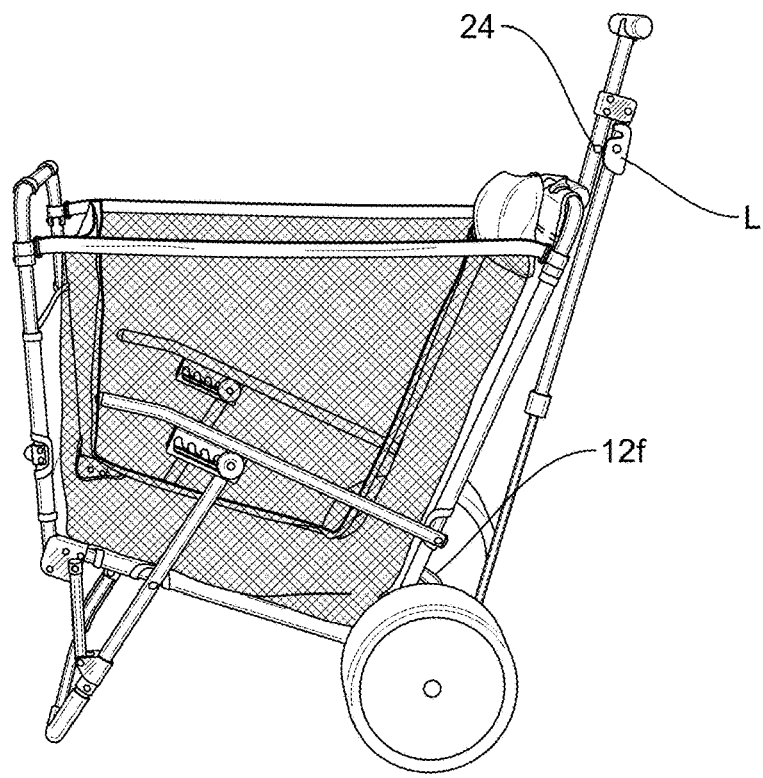
Figure 2R:
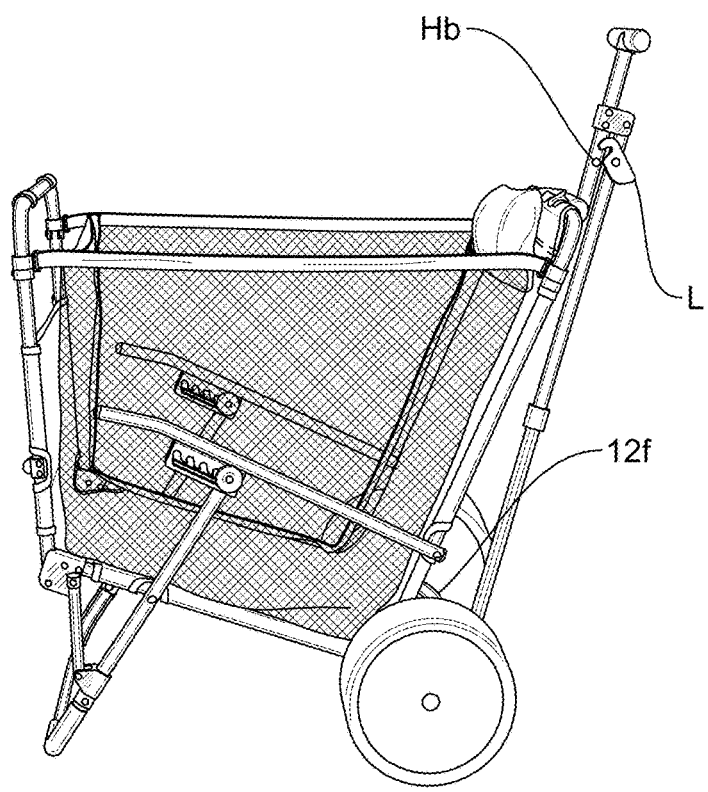
Figure 2S:
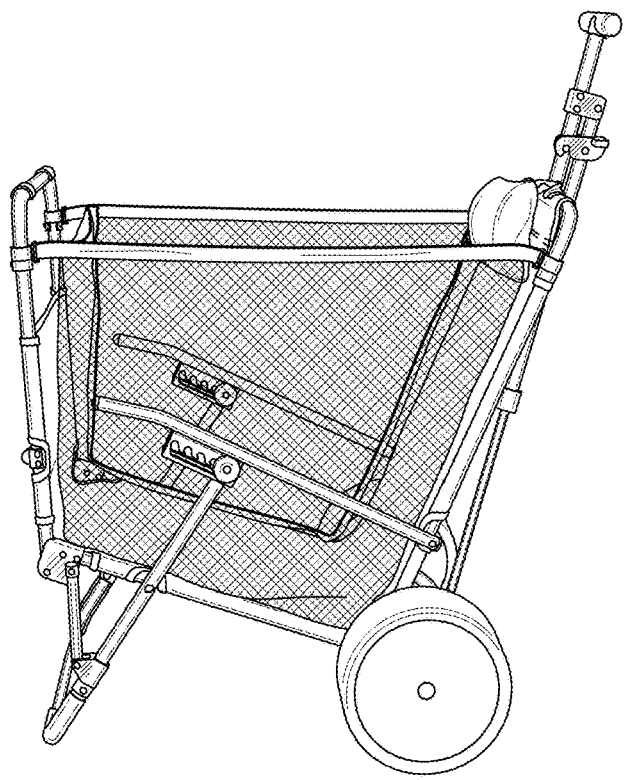

FIGS. 2A to 2S illustrate the sequence of folding from the chair configuration in FIG. 1B to the cart configuration in FIG. 1C:

FIGS. 2A to 2D show the sequence of the back frame 14f being raised from the fully inclined position.

FIGS. 2E to 2G show the sequence of the rest frame 16f being raised from the extended position in FIGS. 2A to 2D, and folded to face the back frame 14f.

FIGS. 2H to 2K show the sequence of the basket B being attached to the back frame 14f and rest frame 16f, and stretched out in the storage space S.

FIGS. 2L to 2S show the sequence of the handle H being pivoted to extend above the back frame 14f. The handle H comprises a handle bar Hb pivotally attached to the back frame 12f, and an extendible handle strut Hs having an end pivotally attached to the handle bar Hb and an opposite end pivotally attached to the base frame 12f. In FIGS. 2L to 2Q, the handle bar Hb is pivoted to extend above the top of the back frame 14f with the handle strut Hs extended. In FIGS. 2R and 2S, the handle strut Hs is secured to the handle bar Hb by the latch L. In the position shown in FIG. 2S, the cart configuration is complete (similar to FIG. 1C). FIG. 3 is a close-up view of the handle strut Hs secured to the handle bar Hb by the latch L latching onto a stud 24 on the side of the handle bar Hb. In this latched position, the handle bar Hb is prevented from pivoting with respect to the back frame 14f to form a rigid handle structure. The handle H facilitates tilting and pulling or pushing the cart on its wheels 22.

The chair cart can be conveniently stowed when not in use and/or transported in the collapsed configuration shown in FIG. 1A.

In use, a person, e.g., a beach goer, initially configures the chair cart in the cart configuration shown in FIG. 1C to carry various articles to be brought to the beach from, e.g., his parked car. After he reached his desired spot on the beach, he reconfigures the cart into the chair configuration shown in FIG. 1B, by undertaking the reverse of the sequence in FIGS. 2A to 2S. The hook of the latch L is unlatched from the stud 24, and the handle H is pivoted from FIGS. 2S to 2L. The basket B is removed. The rest frame 16f is unfolded by following sequence from FIGS. 2G to 2E, and the back frame 14 is inclined to the desired position.

If no articles need to be transported, the user may still set the chair cart in the cart configuration shown in FIG. 1C and use the wheels to push/pull the chair cart to the desired location. Alternatively, the user may set the chair cart in the collapsed configuration shown in FIG. 1A and carry the chair cart to the desired location.

The chair cart is not limited for use for beach outings. The chair may be in the form of a beach chair, patio chair, lounge chair, or chairs for other applications and uses. The materials for various components of the chair cart may be chosen for the intended application. For example, for beach application, the web material W may be made of a synthetic (e.g., plastic) or canvas or cloth material, the frames may be made of metal or hard plastic, and the basket may be made of plastic or cloth material.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

The invention claimed is:

1. A chair cart, comprising:
   a foldable chair, comprising:
   a seat base;
   a seat back pivotally attached to the seat base;
   a handle comprising a handle bar pivotally attached to an upper end of the seat back and a handle strut configured to be extendable and retractable in length, the handle strut pivotally attached to the handle bar and pivotally attached to a rear end of the seat base; and
   a leg rest pivotally attached to the seat base,
   wherein the chair is convertible from a collapsed configuration for stowing the chair, to a chair configuration for seating a person, to a cart configuration for holding articles,
   wherein in the collapsed configuration, the seat base, the seat back and the leg rest are folded to collapse the chair into a compact form,
   wherein in the chair configuration, the seat base, seat back and the leg rest are unfolded to extend support surfaces for the person's back, buttock and legs, and
   wherein in the cart configuration, the leg rest is folded upwards with respect to the seat base to define a storage space above the seat base and between the foot rest and the seat back.

2. The chair cart as in claim 1, wherein in the collapsed configuration, the seat base is folded upwards towards the seat back with the support surfaces of the seat back and seat base facing each other, and the foot rest is folded downwards towards the seat base with the support surfaces of the seat base and leg rest facing away from each other, and wherein in the cart configuration, the leg rest is folded upwards with the support surfaces of the leg rest and seat back facing each other.

3. The chair cart as in claim 2, wherein the seat base has a base frame, the seat back has a back frame, and the leg rest has a rest frame, and wherein the base frame is pivotally attached to the back frame, and the rest frame is pivotally attached to the base frame.

4. The chair cart as in claim 3, wherein the base frame, the back frame and the rest frame support a flexible web material to provide the support surfaces.

5. The chair cart as in claim 4, wherein the web material extends continuously from the rest frame to the base frame and to the back frame.

6. The chair cart as in claim 5, wherein in the cart configuration, a flexible basket is provided in the storage space for holding the articles.

7. The chair cart as in claim 6, wherein in the cart configuration, the flexible basket is attached to the back frame and the rest frame, and rest on the support surface of the seat base, thereby forming a container for securely holding the articles.

8. The chair cart as in claim 7, wherein the chair further comprising a pair of arm rests pivotally attached to opposing sides of the back frame, whereby in the cart configuration, the arm rests provide lateral support for the flexible basket.

9. The chair cart as in claim 8, wherein the chair further comprising legs pivotally attached to opposing sides of the base frame, and having ends pivotally attached to the respective arm rests, thereby providing support of the seat base and the arm rests in the chair configuration.

10. The chair cart as in claim 9, wherein the legs are interconnected to form a leg frame.

11. The chair cart as in claim 10, further comprising a pair of wheels rotatably attached to the base frame proximate the pivot joint between the back frame and the base frame.

12. The chair cart as in claim 11, further comprising struts each having one end slidably coupled to the respective legs and another end pivotally attached to the base frame proximate the pivot joint between the base frame and the rest frame to improve structural integrity of the base frame with respect to the leg frame when in the chair configuration or the cart configuration.

13. The chair cart as in claim 3, wherein the handle is attached to the back frame, thereby facilitating tilting the cart.

14. The chair cart as in claim 13, wherein the handle is further attached to the base frame.

15. The chair cart as in claim 14, wherein the handle bar is pivotally attached to the seat back by a pivotal attachment to the back frame and the handle strut is pivotal attached to the seat base by a pivotal attachment to the base frame.

16. The chair cart as in claim 15, wherein in the chair configuration, the handle bar is pivoted to adjacent the seat back with the handle strut retracted, and wherein in the cart configuration, the handle bar is pivoted to extend above the back frame with the handle strut extended and secured to the handle bar, thereby facilitating tilting and pulling or pushing the cart.

* * * * *